United States Patent
Cho et al.

(10) Patent No.: US 8,439,551 B2
(45) Date of Patent: May 14, 2013

(54) BACKLIGHT ASSEMBLY AND DISPLAY DEVICE HAVING THE SAME

(75) Inventors: Joo-Woan Cho, Asan-si (KR); Jae-Chang Choi, Yongin-si (KR); Yong-Woo Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 506 days.

(21) Appl. No.: 12/569,048

(22) Filed: Sep. 29, 2009

(65) Prior Publication Data

US 2010/0149835 A1 Jun. 17, 2010

(30) Foreign Application Priority Data

Dec. 15, 2008 (KR) ........................ 10-2008-0127331

(51) Int. Cl.
*F21V 7/04* (2006.01)
*F21V 7/00* (2006.01)

(52) U.S. Cl.
USPC ............................ 362/634; 362/632; 362/609

(58) Field of Classification Search .......... 362/632–634, 362/609
See application file for complete search history.

(56) References Cited

U.S. PATENT DOCUMENTS

| | | | | |
|---|---|---|---|---|
| 6,974,242 B1 * | 12/2005 | Chu et al. | ...................... | 362/633 |
| 7,004,614 B2 * | 2/2006 | Tsai et al. | ...................... | 362/633 |
| 7,101,073 B2 * | 9/2006 | Li | ................. | 362/621 |
| 7,121,711 B2 * | 10/2006 | Yamamoto et al. | ........... | 362/633 |
| 7,441,938 B2 * | 10/2008 | Sakai et al. | .................... | 362/634 |
| 7,488,103 B2 * | 2/2009 | Watanabe et al. | ............. | 362/607 |
| 7,611,274 B2 * | 11/2009 | Hsiao et al. | ................... | 362/634 |
| 7,980,750 B2 * | 7/2011 | Shin et al. | ..................... | 362/632 |
| 8,147,113 B2 * | 4/2012 | Hamada | ....................... | 362/631 |
| 8,267,569 B2 * | 9/2012 | Hamada | ....................... | 362/633 |
| 2005/0254258 A1 * | 11/2005 | Lee | ............... | 362/612 |
| 2006/0139962 A1 * | 6/2006 | Shin et al. | ..................... | 362/633 |
| 2007/0047265 A1 * | 3/2007 | Kang et al. | .................... | 362/634 |
| 2007/0165425 A1 * | 7/2007 | Sakamoto et al. | ............ | 362/633 |
| 2007/0247870 A1 * | 10/2007 | Sakai et al. | .................... | 362/612 |
| 2008/0175022 A1 * | 7/2008 | Sugiura et al. | ................ | 362/609 |

FOREIGN PATENT DOCUMENTS

| | | |
|---|---|---|
| JP | 2004-022245 A | 1/2004 |
| JP | 2005-135862 A | 5/2005 |
| JP | 2007-179751 A | 7/2007 |

* cited by examiner

*Primary Examiner* — David J Makiya
(74) *Attorney, Agent, or Firm* — Cantor Colburn LLP (57) ABSTRACT

A backlight assembly includes a light guide plate guiding light, one or more light sources disposed on a side of the light guide plate and generating and providing the light to the light guide plate, a housing including a bottom portion and sidewall portions which each extend from the bottom portion, and accommodating the light guide plate and the light sources, and a light source cover. The light source cover includes a flat portion which contacts a top surface of the light guide plate, a height-adjusting portion which extends upward or downward from the flat portion to form a stepped shape and has the light sources installed thereunder, and fixing portions which extend from the height-adjusting portion and are fixed to a corresponding one of the sidewall portions. A centerline of the light sources is aligned with a centerline of the light guide plate.

20 Claims, 9 Drawing Sheets

BACKLIGHT ASSEMBLY AND DISPLAY DEVICE HAVING THE SAME

This application claims priority to Korean Patent Application No. 10-2008-0127331 filed on Dec. 15, 2008 and all the benefits accruing therefrom under 35 U.S.C. §119, the disclosure of which is incorporated herein by reference in its entirety.

BACKGROUND OF THE INVENTION

1. Field of the Invention

The present invention relates to a backlight assembly and a display device having the same, and more particularly, to a backlight assembly in which a central axis of a light guide plate ("LGP") and that of one or more light sources are matched with each other to maximize efficiency of the light sources and which has an ultra-slim structure, and a display device having the backlight assembly.

2. Description of the Related Art

As modern society becomes more dependent on sophisticated information and communication technology, the market needs for larger and thinner display devices are growing. In particular, since conventional cathode ray tubes ("CRTs") have failed to fully satisfy these market needs, the demand for flat panel displays ("FPDs"), such as plasma display panels ("PDPs"), plasma address liquid crystal display panels ("PALCs"), liquid crystal displays ("LCDs"), and organic light emitting diodes ("OLEDs"), is exploding.

Being low power-consuming, light, and compact, FPDs are widely applied in computer, electronics, and information and technology ("IT") industries. Such a display device includes a liquid crystal panel assembly having a liquid crystal panel which displays image information, a backlight assembly having one or more lamps which emit light and a light guide plate ("LGP") which guides light emitted from the lamps toward the liquid crystal panel, and a housing accommodating the liquid crystal panel assembly and the backlight assembly therein.

Research is actively being conducted to reduce the overall thickness and weight of a display device by reducing sizes of frames and housings which form the exterior of the display device. Meanwhile, efforts are also being made to reduce the overall thickness of a display device by reducing the thickness of an LGP housed in a housing of the display device.

As the thickness of LGPs is reduced almost to that of optical sheets, the arrangement of an LGP and a light source is becoming important. In particular, since the arrangement of an LGP and a light source can directly affect light efficiency, there is a need for a structure which allows the LGP and the light source to be optimally arranged.

BRIEF SUMMARY OF THE INVENTION

Exemplary embodiments of the present invention provide a backlight assembly in which a central axis of a light guide plate ("LGP") and that of one or more light sources are matched (e.g., aligned) with each other to maximize efficiency of the light sources and to minimize an overall thickness of the backlight assembly.

Exemplary embodiments of the present invention also provide a display device including a backlight assembly in which a central axis of an LGP and that of one or more light sources are matched with each other to maximize efficiency of the light sources and to minimize an overall thickness of the display device.

In an exemplary embodiment of the present invention, there is provided a backlight assembly including an LGP guiding light, one or more light sources disposed on a side of the LGP and providing the light to the LGP, a housing including a bottom portion and sidewall portions which extend from the bottom portion and accommodating the LGP and the light sources, and a light source cover. The light source cover includes a flat portion which contacts a top surface of the LGP, a height-adjusting portion which extends upward or downward from the flat portion and then is bent in a stepped shape and has the light sources installed thereunder, and fixing portions which extend from the height-adjusting portion and are fixed to a corresponding one of the sidewall portions. A centerline of the light sources matches (e.g., is aligned with) that of the LGP.

In an exemplary embodiment of the present invention, there is provided a display device including, a display panel displaying images, an LGP guiding light to the display panel, one or more light sources disposed on a side of the LGP and providing the light to the LGP, a housing including a bottom portion and sidewall portions which extend from the bottom portion and accommodating the LGP and the light sources, and a light source cover. The light source cover includes a flat portion which contacts a top surface of the LGP, a height-adjusting portion which extends upward or downward from the flat portion and then is bent in a stepped shape and has the light sources installed thereunder, and fixing portions which extend from the height-adjusting portion and are fixed to a corresponding one of the sidewall portions. A centerline of the light sources matches (e.g., is aligned with) that of the LGP.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "above," "upper," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
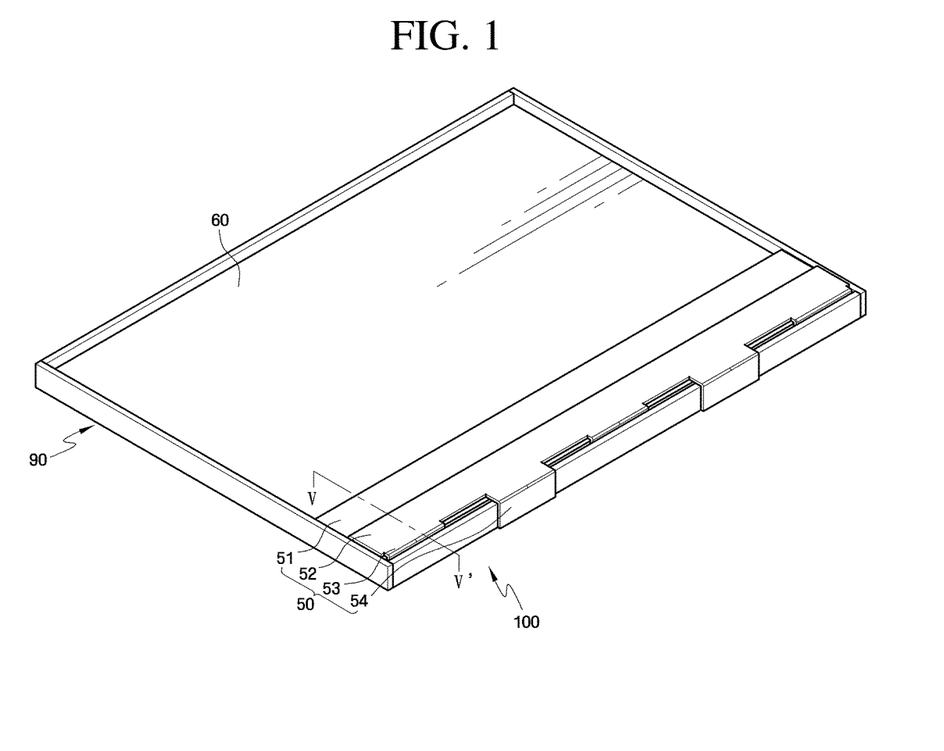
FIG. 1 is a perspective view of a first exemplary embodiment a backlight assembly according to the present invention.
Figure 2:
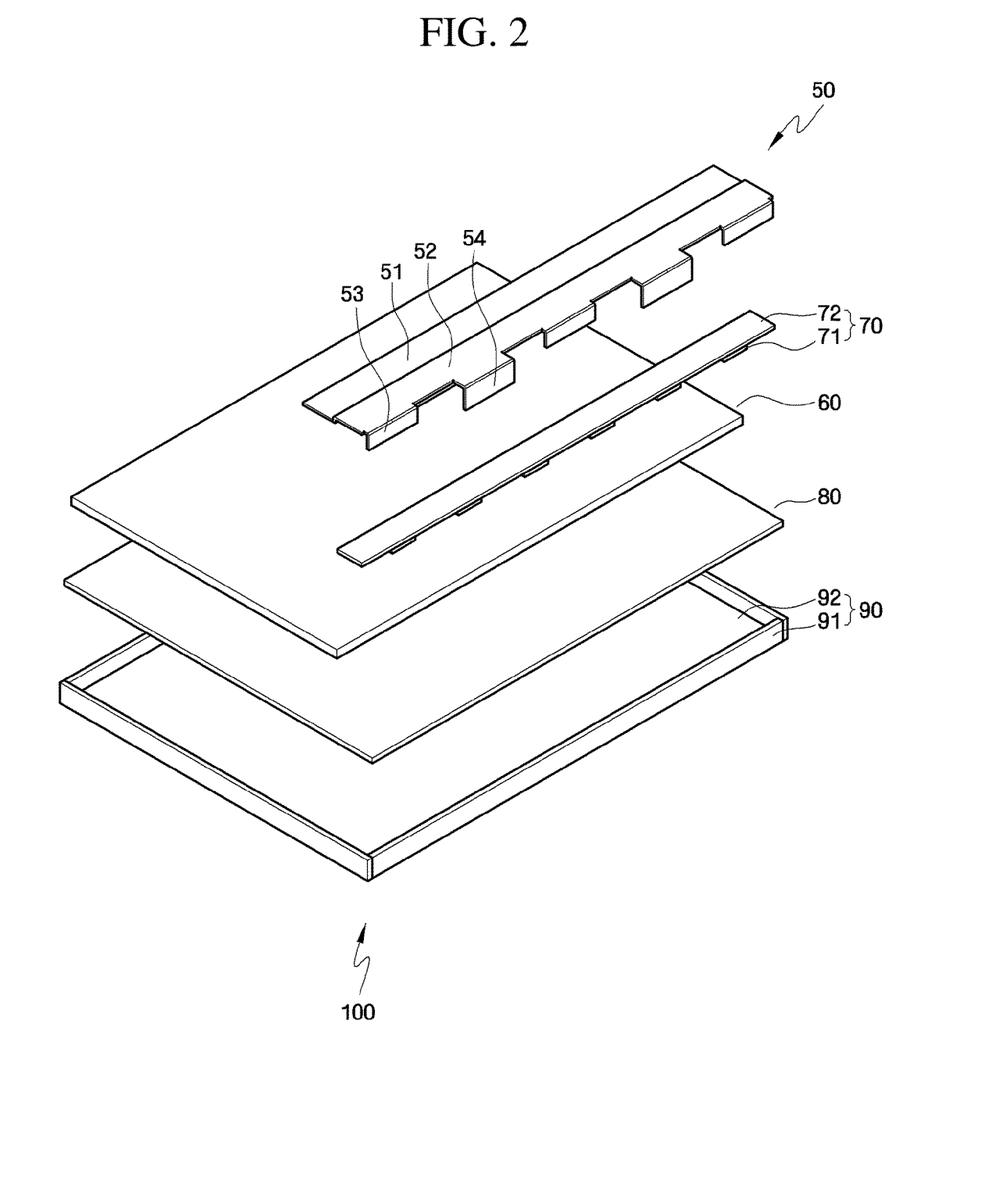
FIG. 2 is an exploded perspective view of the backlight assembly shown in FIG. 1.
Figure 3:
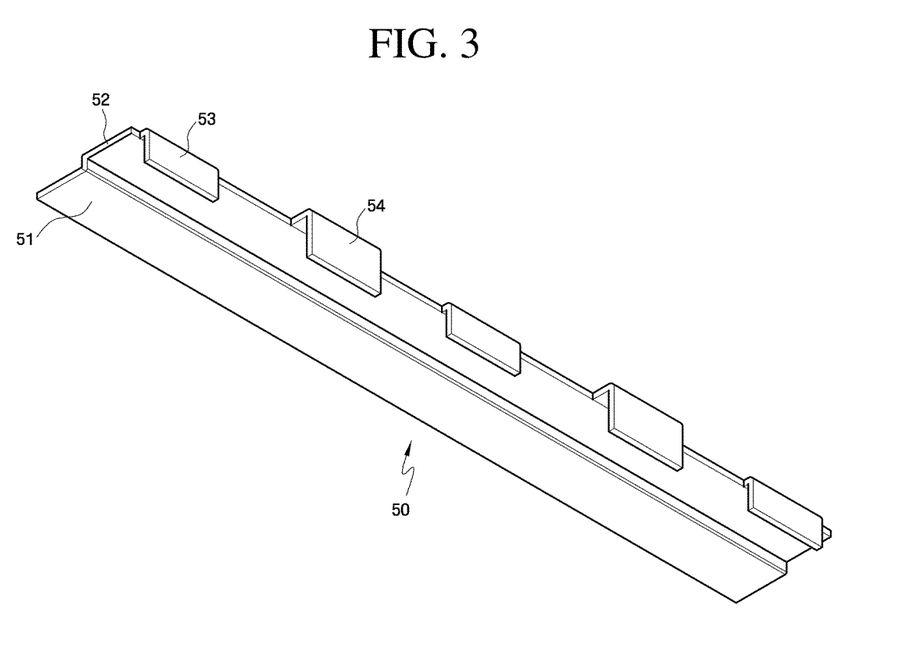
FIG. 3 is a bottom perspective view of an exemplary embodiment of a light source cover included in the backlight assembly shown in FIG. 1.
Figure 4:
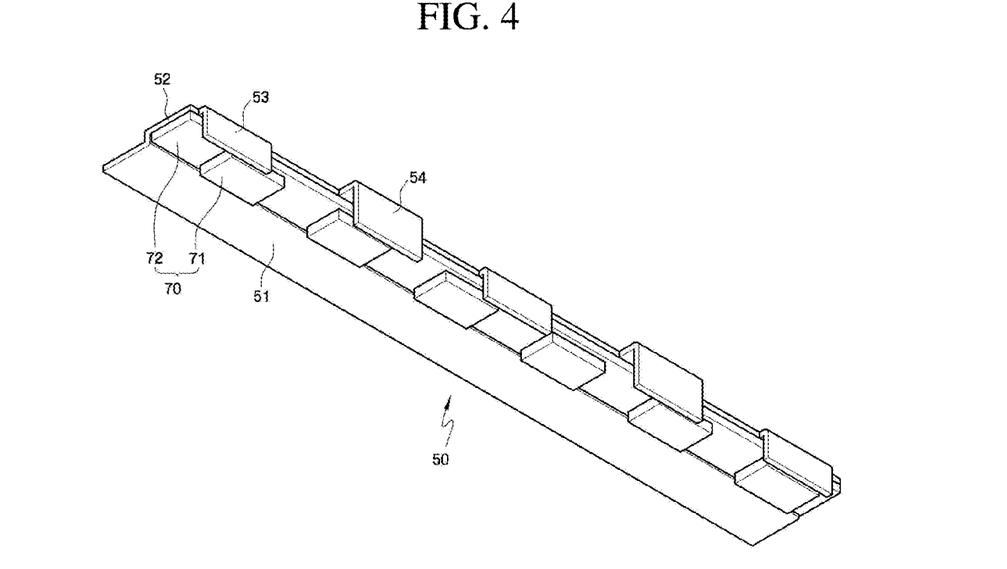
FIG. 4 is a bottom perspective view of an exemplary embodiment of the light source cover of FIG. 3 to which a light source assembly is coupled.
Figure 5:
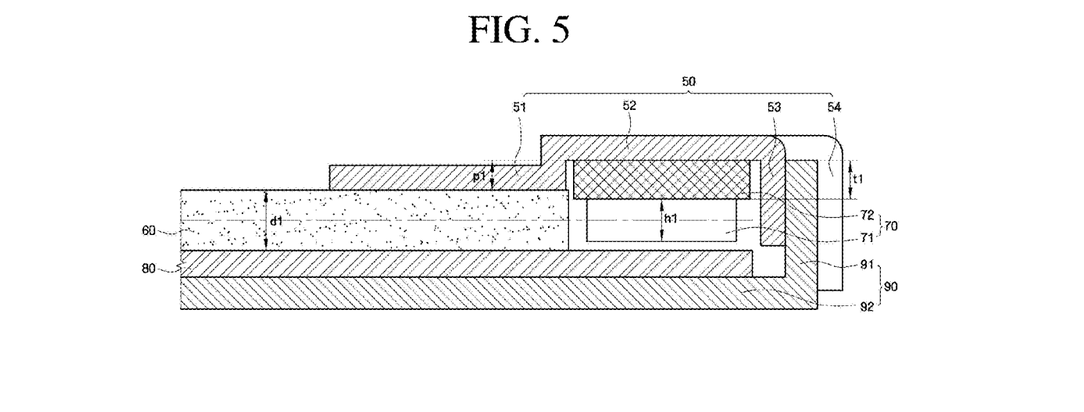
FIG. 5 is a cross-sectional view of the backlight assembly taken along line V-V' of FIG. 1.

Hereinafter, a backlight assembly 100 according to a first exemplary embodiment of the present invention will be described in detail with reference to FIGS. 1 through 5. FIG. 1 is a perspective view of the backlight assembly 100 according to the first exemplary embodiment of the present invention. FIG. 2 is an exploded perspective view of the backlight assembly 100 shown in FIG. 1. FIG. 3 is a bottom perspective view of an exemplary embodiment of a light source cover 50 included in the backlight assembly 100 shown in FIG. 1. FIG. 4 is a bottom perspective view of an exemplary embodiment of the light source cover 50 of FIG. 3 to which a light source assembly 70 is coupled. FIG. 5 is a cross-sectional view of the backlight assembly 100 taken along line V-V' of FIG. 1.

Referring to FIGS. 1 and 2, the backlight assembly 100 includes a light guide plate ("LGP") 60, the light source assembly 70, a reflective sheet 80, and a lower housing 90.

Figure 12:
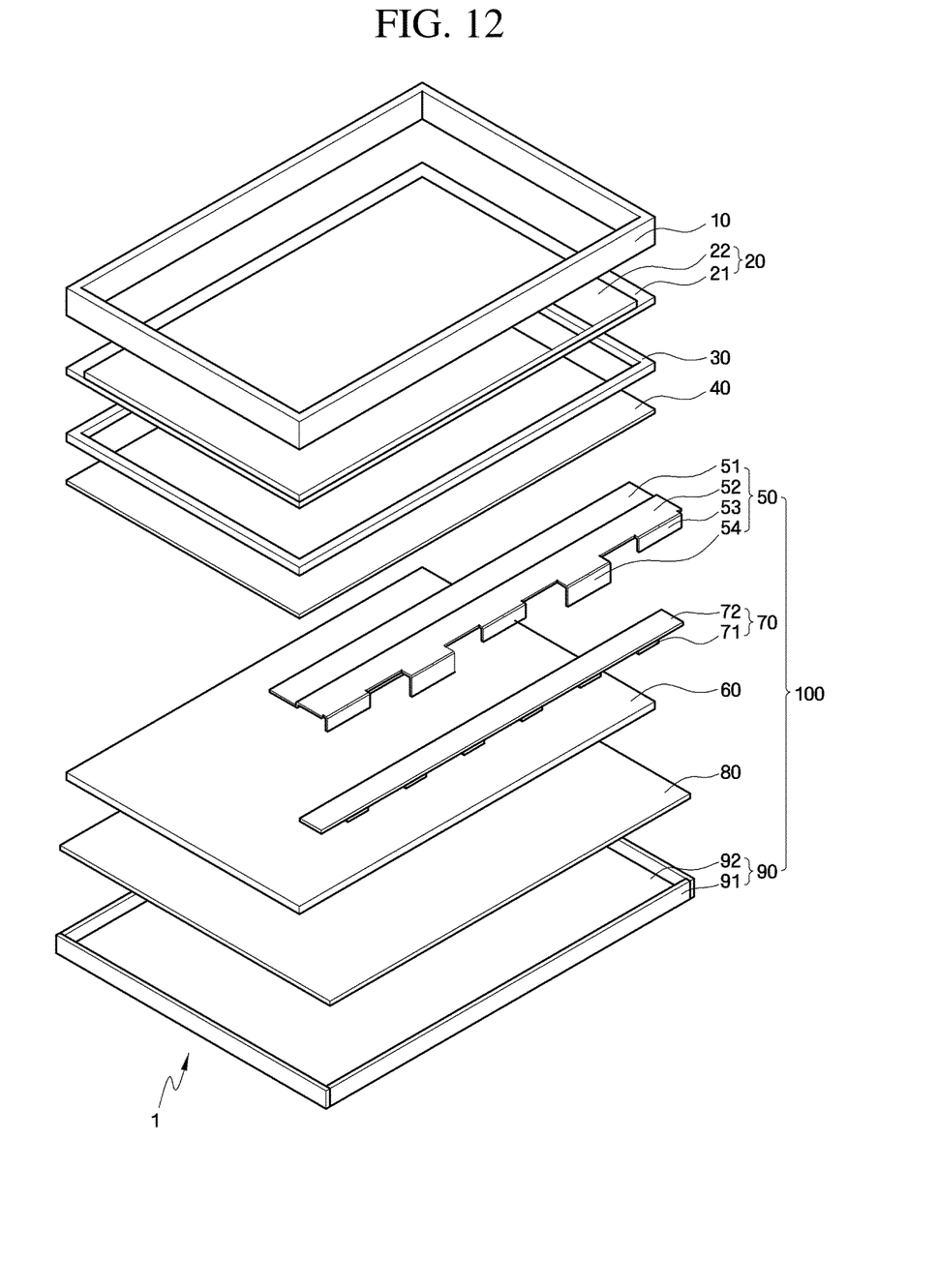
FIG. 12 is an exploded perspective view of an exemplary embodiment of a display device according to the present invention.

The LGP 60 guides light generated and emitted from one or more light source 71 toward a display panel 20 (see FIG. 12). In the illustrated embodiment, a plurality of the light source 71 is arranged in a longitudinal direction of the backlight assembly 100. The LGP 60 of the illustrated embodiment is a panel having a substantially plate or planar shape. The LGP 60 may include a transparent plastic material such as polymethymethacrylate ("PMMA"), and guides light emitted from the light sources 70 toward the display panel 20 disposed above the LGP 60. As used herein, above may be used to refer to a direction or side towards the viewing side of a display device, while below may be used to refer to a direction or side towards a rear of the display device, or the backlight assembly 100.

Light emitted from the light sources 71 enters the LGP 60 at an incident surface thereof, and travels inside the LGP 60 while being substantially totally reflected. A portion of the light totally reflected inside the LGP 60 exits the LGP 60 through a top surface of the LGP 60 facing the display panel 20. The top surface of the LGP 60 from which light exits is referred to as an exit surface. The exit surface of the LGP 60 functions as a surface light source which emits, on the whole, substantially uniform planar light.

In an exemplary embodiment, various patterns may be printed on a bottom surface of the LGP 60 to guide light, which is totally reflected inside the LGP 60, in an upward direction towards the display panel 20. The patterns printed on the bottom surface of the LGP 60 may be diffusion patterns or may form a reflective surface which reflects light.

The LGP 60 may have any of a number of shapes as long as it can allow light incident on a side surface thereof to be totally reflected therein, and then be uniformly output through the exit surface, i.e., the top surface thereof. As in the illustrated embodiment, the LGP 60 may be substantially shaped like a plate having a predetermined thickness or more. However, the present invention is not limited thereto. Alternatively, the LGP 60 may also be shaped like a relatively thin sheet. Even when the LGP 60 is very thin and is substantially a light guide film, the very thin LGP 60 is still referred to as a light guide plate such as to function as a surface light source which emits, on the whole, substantially uniform planar light.

The light source assembly 70 is disposed on a side of the LGP 60, such as longitudinally extending substantially parallel to a longitudinal direction of the backlight assembly 100. Since the light sources 71 are disposed on a side of the LGP 60, the LGP 60 functions as a surface light source which uniformly provides light received from the light sources 71 to the display panel 20. The backlight assembly 100 including light sources 71 disposed on a side of the LGP 60, is referred to as an edge-type backlight assembly.

The light source assembly 70 includes the light sources 71 which generate and emit light, and a circuit board 72 on which the light sources 71 are mounted. The light sources 71 may be point light sources, such as light emitting diodes ("LEDs"). LEDs can provide relatively high-luminance light with relatively low power consumption, and light emitted from LEDs has very high color purity. In addition, since LEDs increase color reproducibility of a display device, a richer color can be represented. A mixture of red light, green light, and blue light respectively emitted from these LEDs may be provided to the LGP 60 in the form of white light.

The light sources 71 are mounted on the circuit board 72 to collectively form the light source assembly 70. Since LEDs are used as the light sources 71 and are mounted on the circuit board 72 to form the light source assembly 70, the light source assembly 70 can advantageously have an ultra-slim structure.

The light sources 71 may not be limited to LEDs. In an alternative exemplary embodiment, one or more lamps may also be used as the light sources 71. The lamps used as the light sources 71 may be line light sources such as cold cathode fluorescent lamps ("CCFLs"), hot cathode fluorescent lamps ("HCFLs"), and external electrode fluorescent lamps ("EEFLs").

In an exemplary embodiment, one or more fluorescent lamps with a very small diameter may be used as the light sources 71 to reduce an overall thickness of the backlight assembly 100.

When the backlight assembly 100 is an edge-type backlight assembly as shown in FIG. 2, each the light sources 71 may be disposed on a side of the LGP 60. Each of the light source assemblies 70 may be disposed on a side of the LGP 60. In an alternative exemplary embodiment, the light sources 71 may be disposed on both of opposing sides of the LGP 60, such as being substantially parallel to each other and the longitudinal direction of the backlight assembly 100.

The reflective sheet 80 is disposed under the LGP 60 and reflects light, which is emitted downward from the LGP 60, in an upward direction towards the display panel 20. The reflective sheet 80 is disposed between the lower housing 90 and the LGP 60. In detail, the reflective sheet 80 is disposed under the LGP 60 and reflects light, which has not been reflected by minute dot patterns disposed on the bottom surface of the LGP 60, toward the exit surface of the LGP 60. Advantageously, the reflective sheet 80 reduces the loss of light which is incident on the display panel 20 (see FIG. 12) and, at the same time, improves the uniformity of light which is output from the exit surface of the LGP 60.

The LGP 60, the reflective sheet 80, and the light source assembly 70 are housed in the lower housing 90. The lower housing 90 includes a plurality of a sidewall portion 91 which collectively forms four walls of the lower housing 90, and a bottom portion 92 which extends from the sidewall portions 91 in a direction towards the display panel 20. The sidewalls 91 and the bottom portion 92 may be disposed as a single, continuous and indivisible member of the backlight assembly 100.

The light source cover 50 is disposed on the LGP 60 and the light sources 70, and between the LGP 60 and the light sources 70, and the display panel 20. The light source cover 50 reduces or effectively prevents leakage of light and accommodates the light source assembly 70. A first portion of the light source cover 50 contacts the LGP 60, and a second portion contacts the lower housing 90.

Referring to FIGS. 2 and 3, the light source cover 50 includes a flat portion 51, a height-adjusting portion 52, first bending portions 53, and second bending portions 54. The flat portion 51, the height-adjusting portion 52, the first bending portion 53 and the second bending portion 54 collectively form the light source cover 50, and are disposed as a single, continuous and indivisible unit.

The flat portion 51 is formed as a substantially flat surface and directly contacts the top surface of the LGP 60. The flat portion 51 overlaps a side, such as a peripheral edge of a top surface, of the LGP 60 to reduce or effectively prevent the separation of the LGP 60 from the lower housing 90. The flat portion 51 overlaps the top (e.g., upper) surface of the LGP 60 in a plan view of the backlight assembly 100.

A surface of the flat portion 51 which contacts the LGP 60 may be coated with a reflective material to minimize the loss of light that passes through the LGP 60. In an exemplary embodiment, an adhesive member (not shown) may be interposed between portions of the flat portion 51 and portions of the LGP 60 which overlap each other. The adhesive member can not only couple the flat portion 51 and the LGP 60 to each other but also improve efficiency of light that passes through the LGP 60 due to the reflective material coated thereon.

The height-adjusting portion 52 adjusts relative heights of the LGP 60 and the light sources 71. The height-adjusting portion 52 extends from a first side edge of the flat portion 51, and forms a step with the flat portion 51. A plane of the height-adjusting portion 52 and a plane of the flat portion 51 are substantially parallel with each other, and the planes are disposed separated from each other in a direction substantially perpendicular to the lower housing 90, such that the height-adjusting portion 52 and the flat portion 51 are not coplanar with each other.

In order to improve efficiency of light incident on the LGP 60, a height (e.g., a thickness in the direction substantially perpendicular to the lower housing 90) of the LGP 60 and that of the light sources 71 should be adjusted relative to each other. Since the height-adjusting portion 52 forms a step with the flat portion 51, the height-adjusting portion 52 can adjust the relative heights of the LGP 60 and the light sources 71 with respect to each other.

When the LGP 60 is relatively thin, the height-adjusting portion 52 may be extended upward from the flat portion 51 and then be bent. The arrangement relationship among the height-adjusting portion 52, the LGP 60, the light sources 70 will be described in detail later.

The height-adjusting portion 52 may be disposed as a surface substantially parallel to the flat portion 51. The light source assembly 70 may be disposed on a bottom surface of the height-adjusting portion 52. A lower surface of the flat portion 51 contacting an upper surface of the LGP 60, is substantially parallel to a lower surface of the height-adjusting member 52 upon which the light source assembly 70 is disposed, the lower surfaces of the flat portion 51 and the height-adjusting member 52 begin disposed offset from each other in the direction substantially perpendicular to the bottom portion 92 of the lower housing 90. The light source assembly 70 may be attached to the light source cover 50 by an adhesive member. A width of the height-adjusting portion 52 may be configured according to a width of the light source assembly 70. The widths may be taken in a direction substantially parallel to the bottom portion 92 of the lower housing 90.

Each of the first and second bending portions 53 and 54 extend from a first side edge of the height-adjusting portion 52 and fix the light source cover 50 to a corresponding one of the sidewall portions 91 of the lower housing 90. The first and second bending portions 53 and 54 function as fixing portions which fix the light source cover 50 to the lower housing 90.

Referring to FIGS. 3-5, each of the first and second bending portion 53 and 54 includes a first portion directly extended from the first side edge of the height-adjusting portion 52 and substantially parallel to the bottom portion of the lower housing 90, and a second portion extending from the first portion, such as towards the lower housing 90. The first and second portions of each other first and second bending portions 53 and 54 are a continuous member and are bent at a point between the first and second portions. The first portion of the second bending portion 54 has a width that is larger than the first portion of the first bending portion 53. An upper surface of both the first portions of the first and second bending portion 53 and 54 are substantially coplanar.

Referring to FIG. 5, a portion of the first bending portions 53 is disposed along an inner side surface of the lower housing 90 to contact an inner side surface of the corresponding one of the sidewall portions 91 of the lower housing 90. An outer side surface of the second portion of the first bending portion 53 is disposed directly adjacent to and contacting the inner side surface of the sidewall portion 91. A portion of the second bending portions 54 is disposed outside the lower housing 90 to contact an outer side surface of the corresponding one of the sidewall portions 91. An inner side surface of the second portion of the second bending portion 54 is disposed directly adjacent to and contacting the outer side surface of the sidewall portion 91.

Referring to FIGS. 3 and 4, the first bending portions 53 alternate with the second bending portion 54 along a longitudinal direction of the light source cover 50. Where the light source cover 50 is combined with the lower housing, the first and second bending portions 53 and 54 are alternately arranged on the light source cover 50 to be respectively disposed on the outer side surface and the inner side surface of the corresponding one of the sidewall portions 91, respectively, thereby fixing the light source cover 50 to the lower housing 90. The light source cover 50 and the lower housing 90 may be coupled to each other solely by the alternating first and second bending portions 53 and 54. In an exemplary embodiment, a separate coupling member may be disposed between the light source cover 50 and the lower housing 90.

Referring to FIGS. 4 and 5, the light source assembly 70 is disposed under (e.g., on a bottom surface of) the light source cover 50. The light source assembly 70 includes the light sources 71 mounted on the circuit board 72, and the circuit board 72 is disposed on the height-adjusting portion 52. The light sources 71 are disposed to face the bottom surface of the light source cover 50.

A centerline of the light sources 71 taken substantially parallel to the bottom portion 92 of the lower housing 90, should align with a centerline of the LGP 60. The centerline of the light sources 71 denotes a line that passes through the center of a thickness of the light sources 71. The centerline of the LGP 60 denotes a line that passes through the center of the thickness of the LGP 60. The centerline of the light sources 71 may be an average path of light emitted from the light sources 71. The single and continuous configuration of the light source cover 50 coupling both the LGP 60 and the light source assembly 70 to the lower housing 90, optimally aligns the light sources 71 of the light source assembly 70 with respect to the LGP 60. By aligning the centerline of the light sources 71 and that of the LGP 60, as shown by the dotted line in FIG. 5, efficiency of light emitted from the light sources 71 can be improved, thereby advantageously reducing power consumption of the backlight assembly 100 and the amount of heat emitted from the light sources 71. Moreover, electromagnetic waves generated by the light sources 71 can be reduced.

Referring again to FIG. 5, a depth of the height-adjusting portion 52 may be adjusted such that a sum of a height p1 of the step between the flat portion 51 and the height-adjusting portion 52, and half a thickness d1 of the LGP 60 is equal to a sum of a thickness t1 of the circuit board 72 and half a height h1 of the light sources 71. A distance between the lower surface of the flat portion 51 and the bottom portion 92 of the lower housing 90, is smaller than a distance between the lower surface of the height-adjusting portion 52 and the bottom portion 92 of the lower housing 90.

The light source cover 50, in which the height-adjusting portion 52 extends upward from the flat portion 51 and then is bent, can be used when the LGP 60 is a very thin sheet. In one exemplary embodiment, when the LGP 60 has a thickness of about 0.7 millimeter (mm) or less, the height of the light sources 71 may be adjusted using the light source cover 50. Advantageously, a single continuous light source cover 50 both fixes the LGP 60 in the bottom housing 90 and fixes the light source assembly 70 to the bottom housing 90, while positioning the light sources 71 relative to the LGP 60.

In an exemplary embodiment, the light source cover 50 may include a conductive material such as metal. The conductive material can block electromagnetic waves generated by the light sources 71 or other electronic parts. When a ground source is connected to the light source cover 50, the effect of blocking electromagnetic waves can be maximized.

Figure 6:
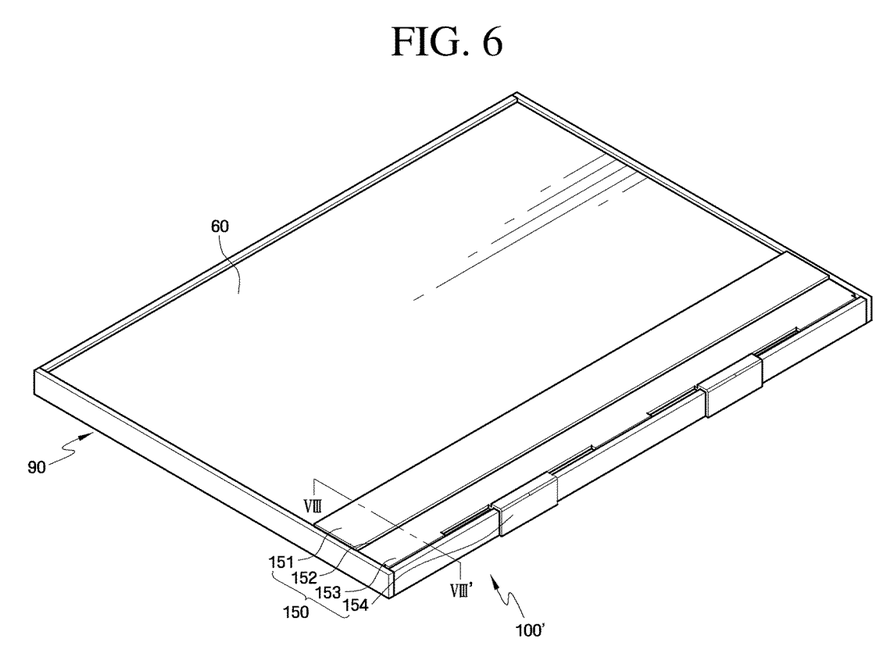
FIG. 6 is a perspective view of a second exemplary embodiment of a backlight assembly according to the present invention.
Figure 7:
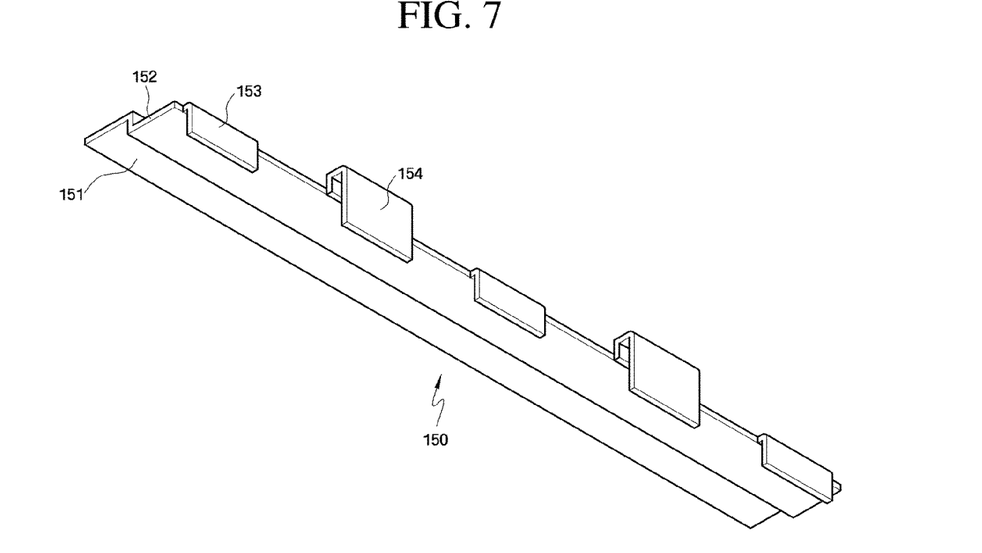
FIG. 7 is a bottom perspective view of an exemplary embodiment of a light source cover included in the backlight assembly shown in FIG. 6.
Figure 8:
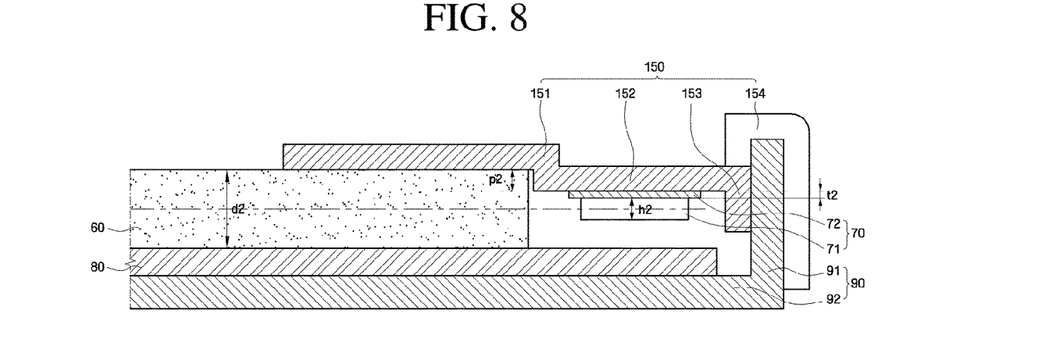
FIG. 8 is a cross-sectional view of the backlight assembly taken along line VIII-VIII' of FIG. 6.

Hereinafter, a backlight assembly 100' according to a second exemplary embodiment of the present invention will be described in detail with reference to FIGS. 6 through 8. FIG. 6 is a perspective view of the backlight assembly 100' according to the second exemplary embodiment of the present invention. FIG. 7 is a bottom perspective view of an exemplary embodiment of a light source cover 150 included in the backlight assembly 100' shown in FIG. 6. FIG. 8 is a cross-sectional view of the backlight assembly 100' taken along line VIII-VIII' of FIG. 6. For simplicity, elements substantially identical to those of the backlight assembly 100 of the first exemplary embodiment are indicated by like reference numerals, and thus their description will be omitted.

Referring to FIGS. 6 through 8, the backlight assembly 100' includes a height-adjusting portion 152 which extends downward from a flat portion 151 and then is bent. The flat portion 151 is formed substantially as a flat surface and directly contacts a top surface of an LGP 60. The flat portion 151 overlaps a side (e.g., peripheral edges) of the LGP 60 to reduce or effectively prevent the separation of the LGP 60 from a lower housing 90. A surface of the flat portion 151 which contacts the LGP 60 is coated with a reflective material to minimize the loss of light that passes through the LGP 60.

The height-adjusting portion 152 adjusts relative heights of the LGP 60 and one or more light sources 71. The height-adjusting portion 152 extends from the flat portion 151 and forms a step with the flat portion 151.

When the LGP 60 is relatively thick, the height-adjusting portion 152 may be disposed to extend downward towards the bottom portion 92 of the lower housing 90, from the flat portion 151 and then be bent to further extend towards the sidewall portion 91 of the lower housing 90. The arrangement relationship among the height-adjusting portion 152, the LGP 60, and the light sources 71 will be described in detail later.

The height-adjusting portion 152 may be disposed as a surface substantially parallel to the flat portion 151. A light source assembly 70 may be disposed on (e.g., adhered to) a bottom surface of the height-adjusting portion 152. The lower surface of the flat portion 151 contacting an upper surface of the LGP 60, is substantially parallel to a lower surface of the height-adjusting member 152 upon which the light source assembly 70 is disposed, the lower surfaces of the flat portion 151 and the height-adjusting member 152 being disposed offset from each other in the direction substantially perpendicular to the bottom portion 92 of the lower housing. A width of the height-adjusting portion 152 may be configured according to a width of the light source assembly 70.

Each of first and second bending portions 153 and 154 extend from the height-adjusting portion 152 and fix the light source cover 150 to a corresponding one of sidewall portions 91 of the lower housing 90. The first and second bending portions 153 and 154 function as fixing portions which fix the light source cover 150 to the lower housing 90. The flat portion 151, the height-adjusting member 152, the first bending portion 153 and the second bending portion 154 are disposed as a single, continuous and indivisible unit, and collectively form the light source cover 150.

Referring to FIGS. 6-8, each of the first and second bending portion 153 and 154 includes a first portion directly extended from the first side edge of the height-adjusting portion 152 and substantially parallel to the bottom portion of the lower housing 90, and a second portion extending from the first portion, such as towards the bottom portion of the lower housing 90. The first and second portions of each other first and second bending portions 153 and 154 are a continuous member and are bent at a point between the first and second portions. The first portion of the second bending portion 154 has a width that is larger than the first portion of the first bending portion 153. An upper surface of both the first portions of the first and second bending portion 53 and 54 are not coplanar.

A portion of the first bending portions 153 is disposed along an inner side surface of the lower housing 90 to contact an inner side surface of the corresponding one of the sidewall portions 91 of the lower housing 90. An outer side surface of the second portion of the first bending portion 153 is disposed directly adjacent to and contacting the inner side surface of the sidewall portion 91. A portion of the second bending portions 154 is disposed outside the lower housing 90 to contact an outer side surface of the corresponding one of the sidewall portions 91. An inner side surface of the second portion of the second bending portion 154 is disposed directly adjacent to and contacting the outer side surface of the sidewall portion 91.

The first and second bending portions 153 and 154 are alternately arranged along a longitudinal direction of the light source cover 150, to be respectively disposed on the outer side surface and the inner side surface of the corresponding one of the sidewall portions 91, thereby fixing the light source cover 150 to the lower housing 90.

Referring to FIGS. 7 and 8, the light source assembly 70 is disposed under the light source cover 150, and between the light source cover 150 and the reflective sheet 80. The light source assembly 70 includes the light sources 71 mounted on a circuit board 72, and the circuit board 72 is disposed on the bottom surface of the height-adjusting portion 152. The light sources 71 are disposed to face a bottom surface of the light source cover 150. A centerline of the light sources 71 should match (e.g., be aligned with) a centerline of the LGP 60.

The single and continuous configuration of the light source cover 150 coupling both the LGP 60 and the light source assembly 70 to the lower housing 90, optimally aligns the light sources 71 of the light source assembly 70 with respect to the LGP 60. By aligning the centerline of the light sources 71 and that of the LGP 60, efficiency of light emitted from the light sources 71 can be improved, thereby advantageously reducing power consumption of the backlight assembly 100' and the amount of heat emitted from the light sources 71. Moreover, electromagnetic waves generated by the light sources 71 can be reduced.

Referring to FIG. 8, when a thickness d2 of the LGP 60 is relatively large, the height-adjusting portion 152 may be indented downward from the top surface of the LGP 60, such as to overlap a light incident side of the LGP 60. In contrast, the height-adjusting member 52 of the first exemplary embodiment is protruded upward from the top surface of the LGP 60 and does not overlap a light incident side of the LGP 60, as shown in FIG. 5. In the illustrated second exemplary embodiment, a sum of a height p2 of a step formed between the flat portion 151 and the height-adjusting portion 152, a thickness t2 of the circuit board 72, and half a height h2 of the light sources 71 may be equal to half the thickness d2 of the LGP 60.

A distance between the lower surface of the flat portion 151 and the bottom portion 92 of the lower housing 90, is larger than a distance between the lower surface of the height-adjusting portion 152 and the bottom portion 92 of the lower housing 90, since the height-adjusting member 152 is indented downward from the top surface of the LGP 60. Where the LGP 60, the light source cover 150, and the light sources 71 have the configuration of the second exemplary embodiment, the centerline of the LGP 60 can match that of the light sources 71, as shown by the dotted line in FIG. 8. Advantageously, a single continuous light source cover 150 both fixes the LGP 60 in the bottom housing 90 and fixes the light source assembly 70 to the bottom housing 90, while positioning the light sources 71 relative to the LGP 60.

Figure 9:
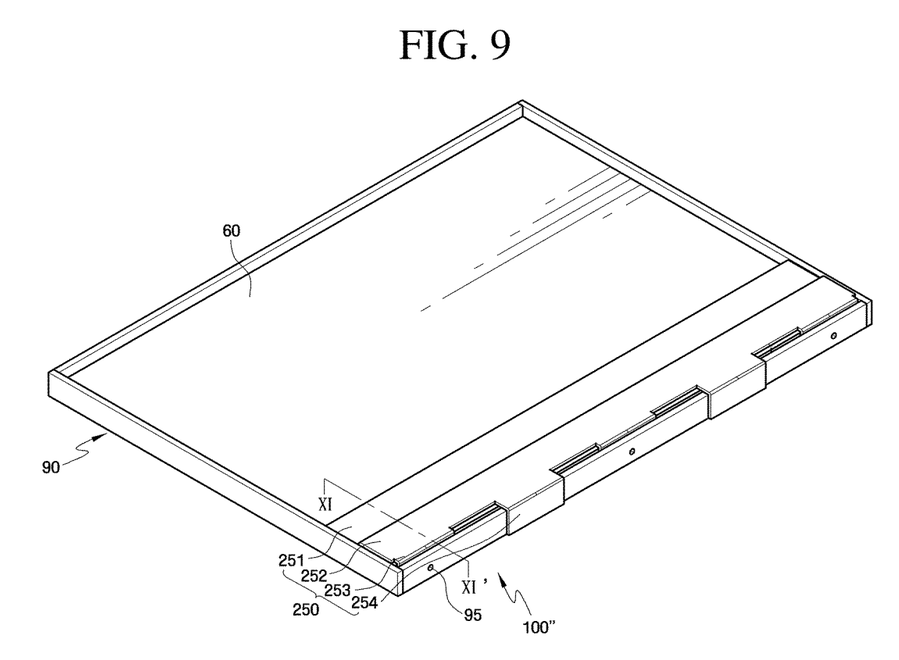
FIG. 9 is a perspective view of third exemplary embodiment of a backlight assembly according to the present invention.
Figure 10:
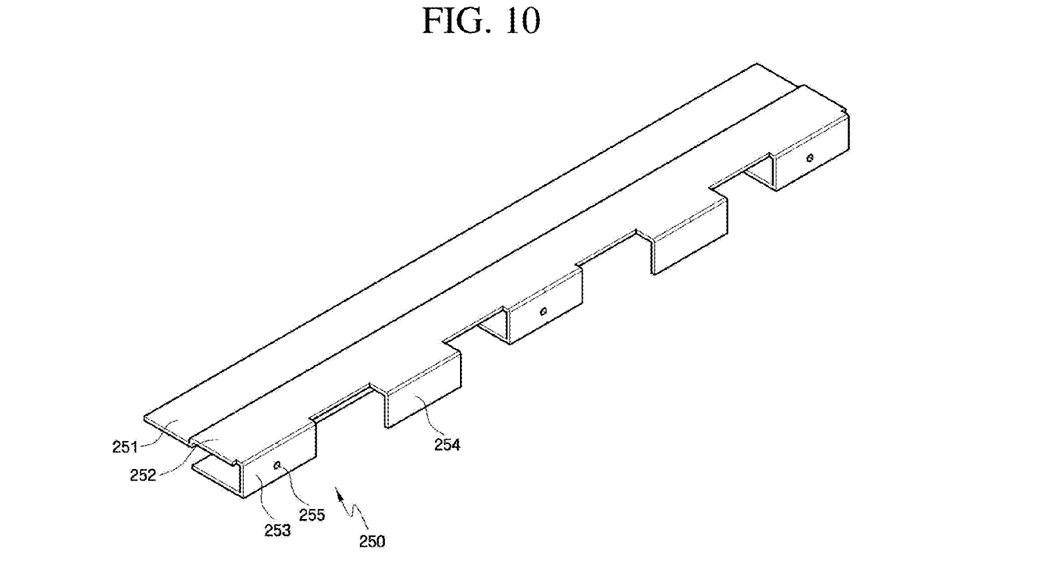
FIG. 10 is a perspective view of an exemplary embodiment of a light source cover included in the backlight assembly shown in FIG. 9.
Figure 11:
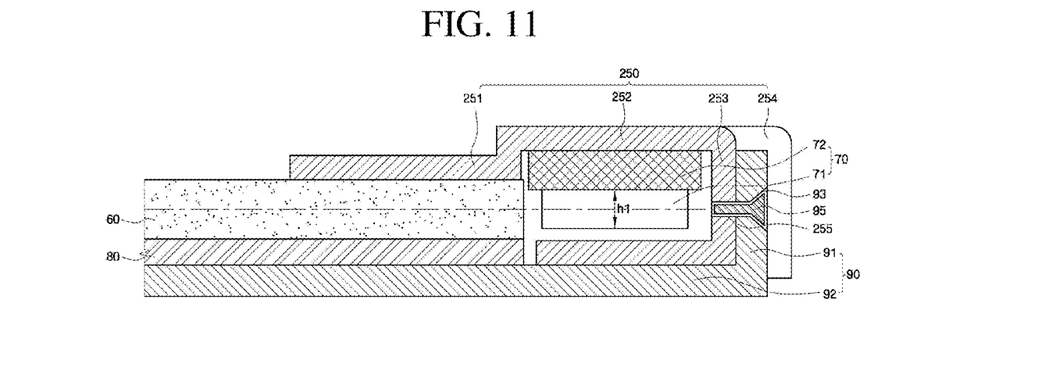
FIG. 11 is a cross-sectional view of the backlight assembly taken along line XI-XI' of FIG. 9.

Hereinafter, a backlight assembly 100" according to a third exemplary embodiment of the present invention will be described in detail with reference to FIGS. 9 through 11. FIG. 9 is a perspective view of the backlight assembly 100" according to the third exemplary embodiment of the present invention. FIG. 10 is a perspective view of an exemplary embodiment a light source cover 250 included in the backlight assembly 100" shown in FIG. 9. FIG. 11 is a cross-sectional view of the backlight assembly 100" taken along line XI-XI' of FIG. 9. For simplicity, elements substantially identical to those of the backlight assembly 100 of the first embodiment are indicated by like reference numerals, and thus their description will be omitted.

Referring to FIGS. 9 through 11, the backlight assembly 100" includes first bending portions 253 which extend towards a bottom portion 92 of a lower housing 90 and then are bent, such that a distal end of the first bending portions 253 face and overlap a height-adjusting portion 152. A flat portion 251 is formed substantially as a flat surface and contacts a top surface of an LGP 60. The flat portion 251 overlaps a side (e.g., edge portions) of the LGP 60 to reduce or effectively prevent the separation of the LGP 60 from the lower housing 90. In an exemplary embodiment, a surface of the flat portion 251 which contacts the LGP 60 is coated with a reflective material to minimize the loss of light that passes through the LGP 60.

The height-adjusting portion 252 adjusts relative heights of the LGP 60 and one or more light sources 71. The height-adjusting portion 252 extends from the flat portion 251 and forms a step with the flat portion 251.

The height-adjusting portion 252 may be formed as a surface substantially parallel to the flat portion 251. A light source assembly 70 may be disposed on a bottom surface of the height-adjusting portion 252. A width of the height-adjusting portion 252 may be defined according to a width of the light source assembly 70.

The first bending portions 253 and second bending portions 254 extend from the height-adjusting portion 252 and fix the light source cover 250 to a corresponding one of sidewall portions 91 of the lower housing 90. The first and second bending portions 253 and 254 function as fixing portions which fix the light source cover 250 to the lower housing 90.

The first bending portions 253 are disposed along an inner side surface of the lower housing 90. The first bending portions 253 contact an inner side surface of the corresponding one of the sidewall portions 91 of the lower housing 90, and further extend such that the distal end of the first bending portion 253 is disposed adjacent to the bottom portion 92. The first bending portions 253 may contact the bottom portion 92 of the lower housing 90 to support the light source cover 250. The light source assembly 70 is disposed between the height-adjusting portion 252 and the first bending portion 253, between the flat portion 251 and the first bending portion 253, and between the flat portion 251 and the second bending portion 254. A first side of the light source cover 250 in a layout view of the backlight assembly 100" may contact the LGP 60 and thus be supported by the LGP 60, and a second side thereof may be supported by the first bending portions 253.

Respective surfaces of the first bending portions 253, which face the light sources 71, respectively, may be coated with a reflective material. Where the reflective material is coated on an inner surface of each of the first bending portions 253, the first bending portions 253 may function as reflectors of the light sources 71, respectively. First coupling holes 255 are disposed in respective portions of the first bending portions 253 which contact the corresponding one of the sidewall portions 91 of the lower housing 90.

Second coupling holes 93 are also disposed in the corresponding one of the sidewall portions 91 of the lower housing 90 which contacts the first bending portions 253. The first coupling holes 255 of the first bending portions 253 are disposed to correspond respectively (e.g., align with) the second coupling holes 93 of the corresponding one of the sidewall portions 91. Each of the first and second coupling holes 255 and 93 are an enclosed opening penetrating partially or wholly through the light source cover 250 and the lower housing 90, respectively. Each of the light source cover 250 and the lower housing 90 solely defines the first and second coupling holes 255 and 93, respectively.

Coupling members 95 are inserted between the first coupling holes 255 and the second coupling holes 93, respectively, and extend into both the first coupling holes 255 and the second coupling holes 93. The coupling members 95 may be coupling mediums such as screws. The first coupling holes 255 are not necessarily disposed in the first bending portions 253. Alternatively, the first coupling holes 255 may be disposed in the second bending portions 254 or in both of the first and second bending portions 253 and 254.

In exemplary embodiments, any of a number of coupling mediums can be used as the coupling members 95, as long as they can couple the lower housing 90 to the light source cover 250. The coupling members 95 are not necessarily disposed in the corresponding one of the sidewall portions 91 of the lower housing 90. In an alternative exemplary embodiment, the coupling members 95 may be disposed in regions where the first bending portions 253 contact the bottom portion 92 of the lower housing 90.

In addition, the light source cover 250 may not necessarily be coupled to the lower housing 90 by screws, and various coupling methods may be used. In one exemplary embodiment, the light source cover 250 and the lower housing 90 may be coupled to each other by hooks. Alternatively, the light source cover 250 and the lower housing 90 may be adhered to each other by an adhesive member.

The second bending portions 254 are bent from the height-adjusting portion 252 to be disposed at an outside the lower housing 90, and contacting an outer side surface of the corresponding portion of the sidewall portions 91. Referring to FIGS. 9 and 10, the first and second bending portions 253 and 254 are alternately disposed along a longitudinal direction of the backlight assembly 100", to be respectively alternately disposed on the outer side surface and the inner side surface of the corresponding one of the sidewall portions 91, thereby fixing the light source cover 250 to the lower housing 90.

The light source assembly 70 is disposed under the light source cover 250. The light source assembly 70 includes the light sources 71 mounted on a circuit board 72, and the circuit board 72 is disposed on the height-adjusting portion 252. The light sources 71 are disposed to face a bottom surface of the light source cover 250. In the illustrated embodiment, a centerline of the light sources 71 is aligned with the centerline of the thickness of the LGP 60.

The single and continuous configuration of the light source cover 250 coupling both the LGP 60 and the light source assembly 70 to the lower housing 90, optimally aligns the light sources 71 of the light source assembly 70 with respect to the LGP 60. By aligning the centerline of the light sources 71 and that of the LGP 60, efficiency of light emitted from the light sources 71 can be improved, thereby advantageously reducing power consumption of the backlight assembly 100" and the amount of heat emitted from the light sources 71. Moreover, electromagnetic waves generated by the light sources 71 can be reduced.

Hereinafter, an exemplary embodiment of a display device 1 according to the present invention will be described in detail with reference to FIG. 12. FIG. 12 is an exploded perspective view of the display device 1 according to the embodiment of the present invention.

Referring to FIG. 12, the display device 1 includes a display panel 20, an upper housing 10, an intermediate frame 30, an optical sheet 40, and a backlight assembly. As a backlight assembly, the display device 1 may include any of the exemplary embodiments of the backlight assembly 100, 100' and 100" illustrated in FIGS. 1-11.

The display panel 20 includes a lower panel 21 and an upper panel 22 facing the lower panel 21. The lower panel 21 includes gate lines (not shown), data lines (not shown), a thin-film transistor ("TFT") array, pixel electrodes, and the like. The upper panel 22 includes color filters, a black matrix, a common electrode, and the like. The color filters and the common electrode may also be disposed on the lower panel 21. The display panel 20 is disposed on the intermediate frame 30, and is disposed between the upper housing 10 and a lower housing 90.

In an exemplary embodiment, the intermediate frame 30 may include polycarbonate ("PC") or a mixture of polycarbonate and acrylonitrile butadiene styrene copolymer. The intermediate frame 30 may include non-translucent resin to reduce or effectively prevent leakage of light to the outside of the display device 1. In addition, the intermediate frame 30 may include a relatively soft material to reduce or effectively prevent damage to the display panel 20.

The optical sheet 40 is disposed under the intermediate frame 30, and between the intermediate frame 30 and the backlight assembly. The optical sheet 40 is disposed on an LGP 60 and diffuses and concentrates light received from the LGP 60. The optical sheet 40 may include one or more of a diffusion sheet, a prism sheet, and a protective sheet. Alternatively, the optical sheet 40 alone may function as the diffusion sheet, the prism sheet, and the protective sheet. In one exemplary embodiment, a lower portion of the optical sheet 40 may have a diffusion function, a prism pattern (not shown) may be disposed in an upper portion of the optical sheet, and a protective layer (not shown) may be disposed on the prism pattern. Since the optical sheet 40 alone can perform the diffusion function and the prism function, the number of components required can be reduced, thereby advantageously minimizing a thickness of the display device 1.

The LGP 60 and a light source assembly 70 are disposed under the optical sheet 40, toward a rear of the display device 1. As described above, the light source assembly 70 is disposed on at least a side of the LGP 60, such as longitudinally extending substantially parallel to the longitudinal direction of the display device 1.

A reflective sheet 80 is disposed under the LGP 60, toward the rear of the display device 1. The LGP 60, the light source assembly 70, and the reflective sheet 80 are received in the lower housing 90, such as in a receiving space defined by a bottom portion 91 and a plurality of a sidewall 91. A light source cover 50 is interposed between the lower housing 90 and the intermediate frame 30 to protect the light source assembly 70.

The single and continuous configuration of the light source cover 50 coupling both the LGP 60 and the light source assembly 70 to the lower housing 90, optimally aligns the light sources 71 of the light source assembly 70 with respect to the LGP 60. By aligning the centerline of the light sources 71 and that of the LGP 60, efficiency of light emitted from the light sources 71 can be improved, thereby advantageously reducing power consumption of the backlight assembly and the amount of heat emitted from the light sources 71. Moreover, electromagnetic waves generated by the light sources 71 can be reduced.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
    a light guide plate guiding light;
    a light source disposed on a side of the light guide plate, and generating and providing the light to the light guide plate;
    a housing comprising a bottom portion, and a sidewall portion which extends from the bottom portion, and accommodating the light guide plate and the light source therein;
    a light source cover comprising:
        a flat portion which overlaps a top surface of the light guide plate,
        a height-adjusting portion continuous with the flat portion and forming a step with the flat portion, the height-adjusting portion disposed substantially parallel with the flat portion and non-coplanar with the flat portion, and
        fixing portions continuous with and extending from the height-adjusting portion, and fixed to the sidewall portion; and
    further comprising a circuit board on which the light source is mounted, wherein the circuit board is between the height-adjusting portion and the light source, and between the fixing portions and the light guide plate.

2. The backlight assembly of claim 1, wherein the circuit board is disposed directly on a bottom surface of the height-adjusting portion.

3. The backlight assembly of claim 2,
    wherein the bottom surface of the height-adjusting portion is disposed further from the bottom portion of the housing than the top surface of the light guide plate, and
    wherein a sum of a height of the step formed between the flat portion and the height-adjusting portion and half a thickness of the light guide plate, is equal to a sum of a thickness of the circuit board and half a height of the light source,
    the heights and the thicknesses taken substantially perpendicular to the bottom portion of the housing.

4. The backlight assembly of claim 2,
    wherein the bottom surface of the height-adjusting portion is disposed closer to the bottom portion of the housing than the top surface of the light guide plate, and
    wherein the sum of a height of the step formed between the flat portion and the height-adjusting portion, a thickness of the circuit board, and half a height of the light source, is equal to half a thickness of the light guide plate,
    the heights and the thicknesses taken substantially perpendicular to the bottom portion of the housing.

5. The backlight assembly of claim 1, wherein the fixing portions comprise:
    first bending portion disposed inside the housing and contacting an inner side surface of the sidewall portion, and
    second bending portion disposed outside the housing and contacting an outer side surface of the sidewall portion.

6. The backlight assembly of claim 5, wherein the first and second bending portions are alternately disposed along a longitudinal extension direction of the sidewall portion.

7. The backlight assembly of claim 5, wherein the first bending portion is disposed contacting both the inner side surface of the sidewall portion and an upper surface of the bottom portion of the housing.

8. The backlight assembly of claim 1, wherein the light source comprise light emitting diode.

9. The backlight assembly of claim 1, further comprising a coupling member coupling the light source cover to the housing.

10. The backlight assembly of claim 1, wherein the light guide plate has a thickness of about 0.7 millimeter (mm) or less.

11. The backlight assembly of claim 1, wherein the light source cover includes a conductive material.

12. The backlight assembly of claim 11, wherein the light source cover is connected to a ground source.

13. The backlight assembly of claim 1, wherein a centerline of the light source is aligned with a centerline of the light guide plate, the centerlines being substantially parallel with the bottom portion of the housing.

14. A display device comprising:
    a display panel displaying images;
    a light guide plate guiding light to the display panel;

a light source disposed on a side of the light guide plate, and generating and providing the light to the light guide plate;

a housing comprising a bottom portion, and sidewall portion which extends from the bottom portion, and accommodating the light guide plate and the light source; and a light source cover comprising:

a flat portion which overlaps a top surface of the light guide plate, a height-adjusting portion continuous with the flat portion and forming a step with the flat portion, the height-adjusting portion being disposed substantially parallel to the flat portion and non-coplanar with the flat portion, and fixing portions continuous with and each extending from the height-adjusting portion, and fixed to a corresponding one of the sidewall portions disposed at the side of the light guide plate; and further comprising a circuit board on which the light source is mounted, wherein the circuit board is between the height-adjusting portion and the light source, and between the fixing portions and the light guide plate.

15. The display device of claim 14, wherein the circuit board is disposed directly on a bottom surface of the height-adjusting portion.

16. The display device of claim 15, wherein the bottom surface of the height-adjusting portion is disposed further from the bottom portion of the housing than the top surface of the light guide plate, and wherein a sum of a height of the step formed between the flat portion and the height-adjusting portion and half a thickness of the light guide plate, is equal to a sum of a thickness of the circuit board and half a height of the light source, the heights and the thicknesses taken substantially perpendicular to the bottom portion of the housing.

17. The display device of claim 15, wherein the bottom surface of the height-adjusting portion is disposed closer to the bottom portion of the housing than the top surface of the light guide plate, and wherein a sum of a height of the step formed between the flat portion and the height-adjusting portion, a thickness of the circuit board, and half a height of the light sources, is equal to half a thickness of the light guide plate, the heights and the thicknesses taken substantially perpendicular to the bottom portion of the housing.

18. The display device of claim 14, wherein the fixing portions comprise:

first bending portion disposed inside the housing and contacting an inner side surface of the corresponding one of the sidewall portion, and second bending portion disposed outside the housing and contacting an outer side surface of the corresponding one of the sidewall portion.

19. The display device of claim 14, wherein a centerline of the light source is aligned with a centerline of the light guide plate, the centerlines being substantially parallel with the bottom portion of the housing.

20. The display device of claim 14, wherein the light sources comprise light emitting diodes.

* * * * *